United States Patent [19]
Snyder, Jr.

[11] Patent Number: 5,927,674
[45] Date of Patent: Jul. 27, 1999

[54] SUPPORT STAND FOR SUPPORTING PROJECT BOARD

[76] Inventor: Charles A. Snyder, Jr., 311 Dautrich Rd., Reading, Pa. 19606

[21] Appl. No.: 09/044,331

[22] Filed: Mar. 19, 1998

[51] Int. Cl.[6] .................................................. A47G 1/24
[52] U.S. Cl. ................................. 248/456; 40/124
[58] Field of Search .......................... 248/456, 455, 248/454; 40/124.4, 124

[56] References Cited

U.S. PATENT DOCUMENTS

| | | | |
|---|---|---|---|
| D. 187,379 | 3/1960 | Hoven et al. | 40/124 X |
| 2,742,292 | 4/1956 | McDonough | 40/124.4 X |
| 3,361,131 | 1/1968 | Barger | 248/454 X |
| 4,291,882 | 9/1981 | Del Monte | 40/124.4 X |
| 4,295,623 | 10/1981 | Schweizer | 248/456 |
| 5,081,936 | 1/1992 | Drieling | 108/43 |

*Primary Examiner*—Ramon O. Ramirez

[57] ABSTRACT

A new support stand for project boards for supporting various sized project boards at different-angles for hands-off viewing. The inventive device includes a base member with an upper surface, a lower surface, a first end region, a second end region, and a pair of lateral sides. The upper surface includes a first support channel that supports a substantially planar project board inserted within it. The first support channel is located near the first end region. A second support channel may be provided near the second end region to hold a project board at a different viewing angle than when held in the first support channel.

16 Claims, 2 Drawing Sheets

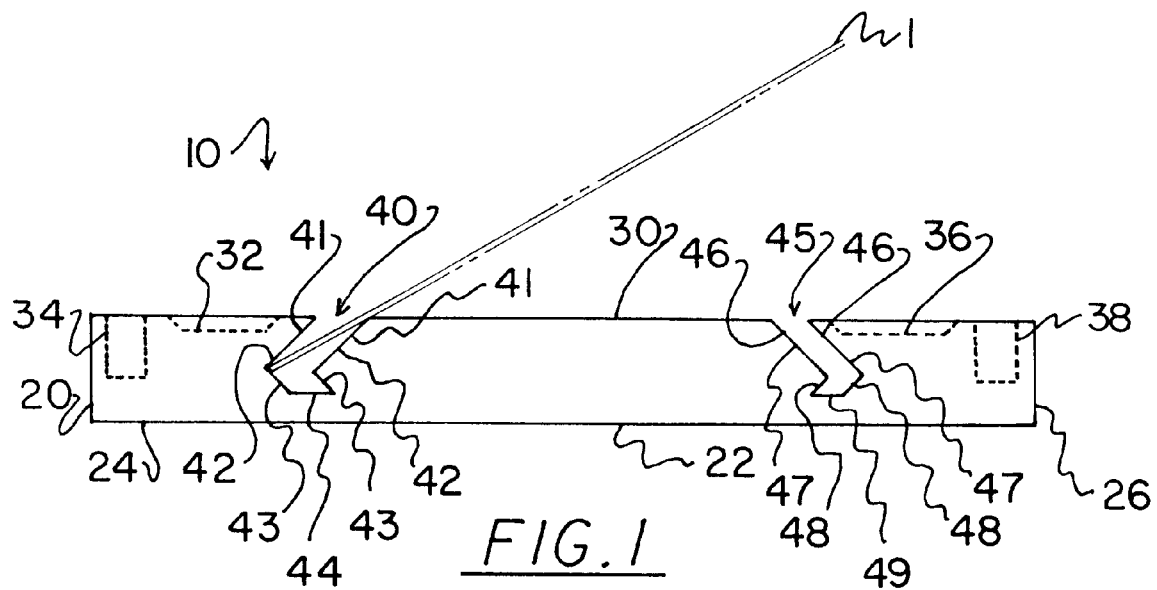
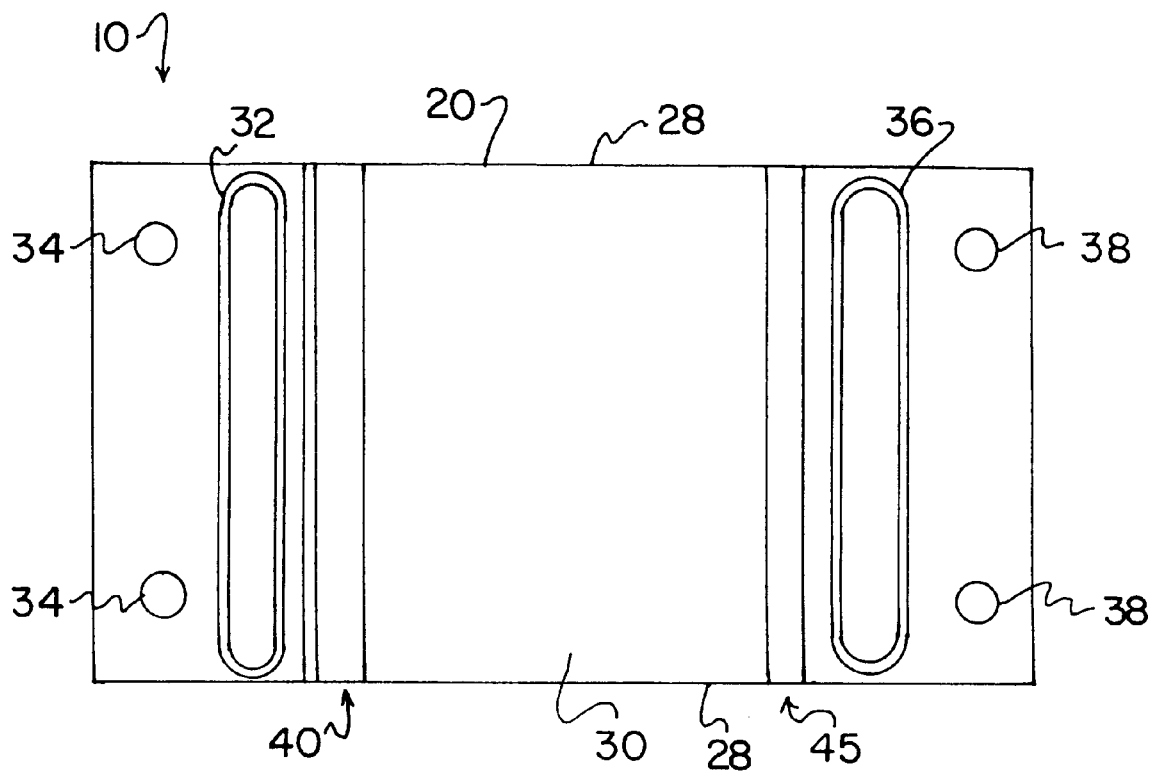

SUPPORT STAND FOR SUPPORTING PROJECT BOARD

BACKGROUND OF THE INVENTION

1. Field of the Invention

The present invention relates to support stands and more particularly pertains to a new support stand for project boards for supporting various sized project boards at different angles for hands-off viewing.

2. Description of the Prior Art

The use of support stands is known in the prior art. More specifically, support stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art support stands include U.S. Pat. No. 4,618,119; U.S. Pat. No. 4,295,624; U.S. Pat. No. Des. 328,314; U.S. Pat. No. 4,044,980; U.S. Pat. No. 4,645,163; and U.S. Pat. No. 3,980,266.

While these devices fulfill their respective, particular objectives and requirements, the aforementioned patents do not disclose a new support stand for project boards. The inventive device includes a base member with an upper surface, a lower surface, a first end region, a second end region, and a pair of lateral sides. The upper surface includes a first support channel that supports a substantially planar project board inserted within it. The first support channel is located near the first end region. A second support channel may be provided near the second end region to hold a project board at a different viewing angle than when held in the first support channel.

In these respects, the support stand for project boards according to the present invention substantially departs from the conventional concepts and designs of the prior art, and in so doing provides an apparatus primarily developed for the purpose of supporting various sized project boards at different angles for hands-off viewing.

SUMMARY OF THE INVENTION

In view of the foregoing disadvantages inherent in the known types of support stands now present in the prior art, the present invention provides a new support stand for project boards construction wherein the same can be utilized for supporting various sized project boards at different angles for hands-off viewing.

The general purpose of the present invention, which will be described subsequently in greater detail, is to provide a new support stand for project boards apparatus and method which has many of the advantages of the support stands mentioned heretofore and many novel features that result in a new support stand for project boards which is not anticipated, rendered obvious, suggested, or even implied by any of the prior art support stands, either alone or in any combination thereof.

To attain this, the present invention generally comprises a base member with an upper surface, a lower surface, a first end region, a second end region, and a pair of lateral sides. The upper surface includes a first support channel that supports a substantially planar project board inserted within it. The first support channel is located near the first end region. A second support channel may be provided near the second end region to hold a project board at a different viewing angle than when held in the first support channel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new support stand for project boards apparatus and method which has many of the advantages of the support stands mentioned heretofore and many novel features that result in a new support stand for project boards which is not anticipated, rendered obvious, suggested, or even implied by any of the prior art support stands, either alone or in any combination thereof.

It is another object of the present invention to provide a new support stand for project boards which may be easily and efficiently manufactured and marketed.

It is a further object of the present invention to provide a new support stand for project boards which is of a durable and reliable construction.

An even further object of the present invention is to provide a new support stand for project boards which is susceptible of a low cost of manufacture with regard to both materials and labor, and which accordingly is then susceptible of low prices of sale to the consuming public, thereby making such support stand for project boards economically available to the buying public.

Still yet another object of the present invention is to provide a new support stand for project boards which provides in the apparatuses and methods of the prior art some of the advantages thereof, while simultaneously overcoming some of the disadvantages normally associated therewith.

Still another object of the present invention is to provide a new support stand for project boards for supporting various sized project boards at different angles for hands-off viewing.

Yet another object of the present invention is to provide a new support stand for project boards which includes a base member with an upper surface, a lower surface, a first end region, a second end region, and a pair of lateral sides. The upper surface includes a first support channel that supports a substantially planar project board inserted within it. The first support channel is located near the first end region. A second support channel may be provided near the second end region to hold a project board at a different viewing angle than when held in the first support channel.

Still yet another object of the present invention is to provide a new support stand for project boards that makes the crafting process easier by supporting crafting boards at a comfortable angle and allowing the crafter's hands to be free to complete a project.

Even still another object of the present invention is to provide a new support stand for project boards that includes instrument depressions and instrument cavities for holding crafting materials or writing utensils.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new support stand for project boards according to the present invention.

FIG. 2 is a top view of the present invention.

DESCRIPTION OF THE PREFERRED EMBODIMENT

Figure 3:
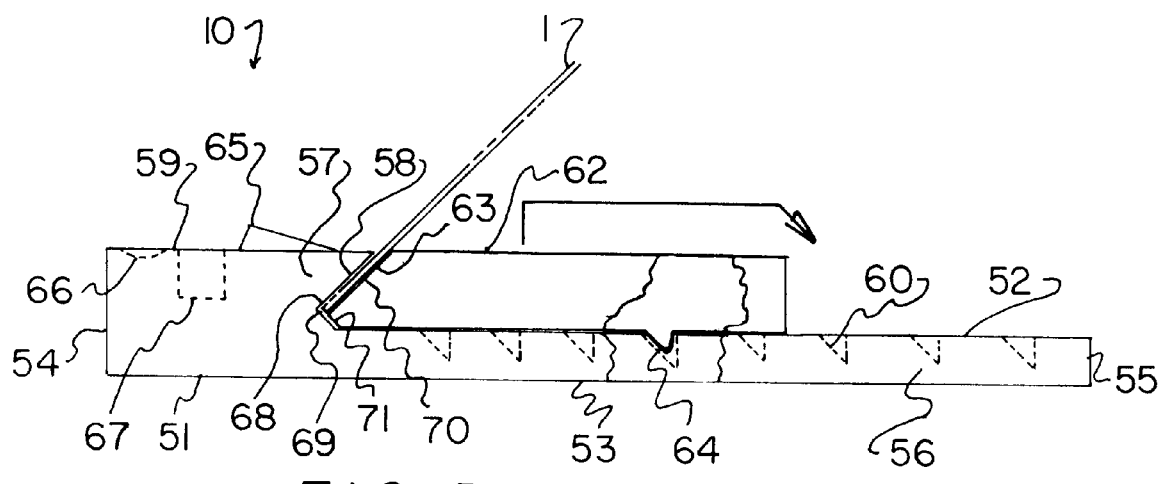
FIG. 3 is a side view of an optional embodiment of the present invention.

With reference now to the drawings, and in particular to FIGS. 1 through 4 thereof, a new support stand for project boards embodying the principles and concepts of the present invention and generally designated by the reference numeral 10 will be described.

As best illustrated in FIGS. 1 through 4, the support stand for project boards 10 comprises a base member 20 with an upper surface 30 and a first end region 24. The upper surface 30 includes a first support channel 40 that supports a substantially planar project board 1 inserted within it. The first support channel 40 is located near the first end region 24.

The base member 20 includes an upper surface 30, a lower surface 22, a first end region 24, a second end region 26, and a pair of lateral sides 28. Preferably, the base member 20 is elongate.

As shown in FIGS. 1 and 2, the upper surface 30 of the base member 20 has a first support channel 40, an elongate first instrument depression 32, and a cylindrical first instrument cavity 34 all located towards the first end region 24. Preferably, the first support channel 40 extends between the lateral sides 28.

Also preferably, the upper surface 30 further includes a pair of spaced apart cylindrical first instrument cavities 34. The first instrument cavities 34 and first instrument depression 32 are useful for holding instruments such as pointers, markers, or craft supplies. Ideally, each first instrument cavity 34 is positioned adjacent a lateral side 28. The first instrument depression 32 extends between the lateral sides 28 and is positioned between the first instrument cavities 34 and the first support channel 40.

Preferably, as shown in FIG. 1, the first support channel 40 has a pair of spaced apart first support channel side walls 41 and a first support channel base wall 44. Each first support channel side wall 41 has an upper portion 42 and a lower portion 43 which are orientated with each other at an angle. Also preferably, the upper portions 42 of each first support channel side wall 41 are aligned substantially parallel to one another and the lower portions 43 of each first support channel side wall 41 are aligned substantially parallel to one another.

In the preferred embodiment, as shown in FIGS. 1 and 2, the upper surface 30 further comprises a second support channel 45 for receiving a second project board (not shown) and holding it at a different viewing angle. An elongate second instrument depression 36 and a pair of spaced apart cylindrical second instrument cavities 38 are included in the upper surface 30 as well. The second support channel 45, the second instrument depression 36, and the second instrument cavities 38 are located towards the second end region 26.

The second support channel 45 includes a pair of spaced apart second support channel side walls 46 and a second support channel base wall 49. Each second support channel side wall 46 has an upper portion 47 and a lower portion 48 which are orientated with each other at an angle. The upper portions 47 of each second support channel side wall 46 are aligned substantially parallel to one another. The lower portions 48 of each second support channel side wall 46 are aligned substantially parallel to one another.

Each second instrument cavity 38 is positioned adjacent a base member lateral side 28. The second support channel 45 extends between the lateral sides 28. The second instrument depression 36 extends between the lateral sides 28. Ideally, the second instrument depression 36 is positioned between the second instrument cavities 38 and the second support channel 45.

Figure 4:
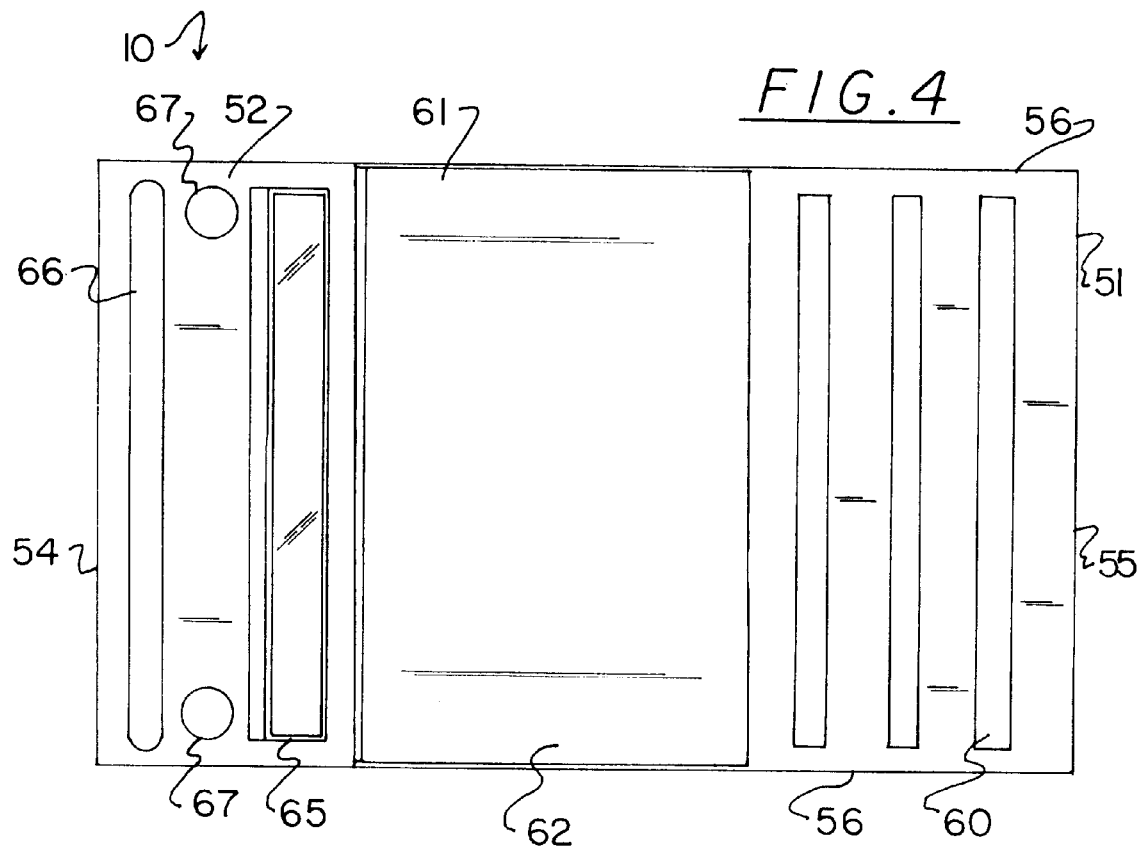
FIG. 4 is a top view of the optional embodiment of the present invention.

In an optional embodiment, as illustrated in FIGS. 3 and 4, the support stand for project boards 10 comprises an elongate base member 51. The base member 51 has an upper surface 52, a lower surface 53, a first end 54, a second end 55, and a pair of lateral sides 56.

A support portion 57 extends from the base member upper surface 52 and includes a support portion upper surface 59 and a support portion side wall 58. The base member upper surface 52 has a plurality of spaced apart adjustment grooves 60 which are arrayed between the second end 55 and the support portion side wall 58.

The optional embodiment also includes a tilt support member 61 with a tilt support member side wall 63 and a tilt support member lower surface 62. The tilt support member lower surface 62 rests on the base member upper surface 52. The tilt support member lower surface 62 has a mounting ridge 64 which engages an adjustment groove 60. The tilt support member 61 faces the support portion side wall 58 to define a channel therebetween for accepting a project board 1.

Preferably, the support portion 57 is located towards the first end 54. The support portion side wall 58 extends between the lateral sides 56 of the base member 51. Ideally, the support portion upper surface 59 has a light source 65 for providing lighting to a project board 1 supported by the support stand for project boards 10. The support portion 57 may also further include an elongate instrument depression 66 and a pair of spaced apart cylindrical instrument cavities 67.

Ideally, as shown in FIG. 4, the light source 65, instrument depression 66, and instrument cavities 67 are located towards the first end 54. Each instrument cavity 67 is positioned adjacent a lateral side 56 and between the instrument depression 66 and light source 65.

The support portion side wall 58 has an upper portion 68 and a lower portion 69 which are orientated with each other at an angle. The tilt support member side wall 63 has an upper portion 70 and a lower portion 71 which are orientated with each other at an angle. The upper portion 70 of the tilt support member side wall 63 is aligned substantially parallel to the upper portion 68 of the support portion side wall 58. The lower portion 71 of the tilt support member side wall 63 is aligned substantially parallel to the lower portion 69 of the support portion side wall 58.

In a variation of the optional embodiment, a spring-loaded bolt (not shown) can be incorporated into the tilt support member 61 that keeps the tilt support member 61 from being separated from the base member 51 but still able to be lifted up to adjust its position.

In use, as shown in FIG. 1, a project board 1 is inserted into the first support channel 40. If a steeper angle between the project board 1 and the base member upper surface 30 is desired, the project board may be inserted into the second support channel 45.

When using the optional embodiment, as shown in FIG. 3, the tilt support member 61 is positioned such that the distance between the tilt support member side wall 63 and the support portion side wall 58 is the approximate width of the project board 1 to be supported. The mounting ridge 64 engages the appropriate adjustment groove 60 to hold the tilt support member 61 in the selected position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A support stand for supporting a substantially planar project board, said support stand comprising:

a base member having an upper surface, a lower surface, a first end region, a second end region, and a pair of lateral sides;

said upper surface of said base member having a first support channel, a second support channel, an elongate first instrument depression, and a cylindrical first instrument cavity;

said first support channel being for supporting a project board inserted therein;

said first support channel, said first instrument depression, said first instrument cavity being located towards said first end region;

said first and second support channels each having a spaced apart pair of side walls and a base wall connecting said side walls of the respective support channel together;

each of said side walls of each support channel having upper and lower portions, said upper portion of each side wall being positioned adjacent the associated lower portion of the respective side wall;

said upper portions of said side walls intersecting said upper surface of said base member;

said lower portions of said side walls being positioned adjacent the associated base wall of the respective support channel; and said upper portion of each of said side walls being extended at an angle less than about 180 degrees from the associated lower portion of the respective side wall.

2. The support stand of claim 1, wherein said base member is elongate.

3. The support stand of claim 1, wherein said upper surface of said base member further includes a cylindrical second instrument cavity being spaced apart from said first instrument cavity.

4. The support stand of claim 1, wherein each said first instrument cavity is positioned adjacent a said lateral side, said first support channel being extended between said lateral sides, said first instrument depression being extended between said lateral sides, and wherein said first instrument depression is positioned between said first instrument cavities and said first support channel.

5. The support stand of claim 1, wherein said upper and lower portions of said channel side walls are orientated at an angle with respect to each other, said upper portion of each said first support channel side wall being aligned substantially parallel to one another, and said lower portion of each said first support channel side wall being aligned substantially parallel to one another.

6. The support stand of claim 1, wherein said upper surface of said base member further includes an elongate second instrument depression, and a pair of spaced apart cylindrical second instrument cavities, and wherein said second support channel, said second instrument depression, said second instrument cavities are located towards said second end region.

7. The support stand of claim 6, wherein said upper and lower portions of said channel side walls are orientated at an angle with respect to each other, said upper portion of each said support channel side wall being aligned substantially parallel to one another, and said lower portion of each said second support channel side wall being aligned substantially parallel to one another.

8. The support stand of claim 6, wherein each said second instrument cavity is positioned adjacent a said lateral side, said second support channel being extended between said lateral sides, said second instrument depression being extended between said lateral sides, and said second instrument depression being positioned between said second instrument cavities and said second support channel.

9. The support stand of claim 1, wherein said upper portion of each of said side walls is extended at an angle of about 90 degrees from the associated lower portion of the respective side wall.

10. A support stand for supporting a substantially planar project board, said support stand comprising:

an elongate base member having an upper surface, a lower surface, a first end, a second end, a support portion, and a pair of lateral sides;

said support portion having a support portion upper surface and a support portion side wall, said support portion being extended from said base member upper surface;

said upper surface of said base member having a plurality of spaced apart adjustment grooves being arrayed between said second end and said support portion side wall;

a tilt support member having a tilt support member side wall, and a tilt support member lower surface, said tilt support member lower surface having a mounting ridge, said tilt support member lower surface resting on said base member upper surface, said mounting ridge being engaged to a said adjustment groove; and said tilt support member facing said support portion side wall, said tilt support member side wall and said support portion side wall defining a channel therebetween for accepting a project board therein.

11. The support stand of claim 10, wherein said support portion is located towards said first end and said support portion side wall is extended between said lateral sides of said base member.

12. The support stand of claim 10, wherein said support portion upper surface has a light source.

13. The support stand of claim 12, wherein said support portion upper surface further includes an elongate instrument depression, and a pair of spaced apart cylindrical instrument cavities.

14. The support stand of claim 13, wherein said light source, said instrument depression, said instrument cavities are located towards said first end, and wherein each said instrument cavity is positioned adjacent a said lateral side, and wherein said instrument cavities are positioned between said instrument depression and said light source.

15. The support stand of claim 10, wherein said support portion side wall has an upper portion and a lower portion being orientated with each other at an angle, and wherein said tilt support member side wall has an upper portion and a lower portion being orientated with each other at an angle, said upper portion of said tilt support member side wall being aligned substantially parallel to said upper portion of said support portion side wall, said lower portion of said tilt support member side wall being aligned substantially parallel to said lower portion of said support portion side wall.

16. A support stand for supporting a substantially planar project board, said support stand comprising:

an elongate base member having an upper surface, a lower surface, a first end region, a second end region, and a pair of lateral sides;

said upper surface of said base member having a first support channel, an elongate first instrument depression, a pair of spaced apart cylindrical first instrument cavities, a second support channel, an elongate second instrument depression, and a pair of spaced apart cylindrical second instrument cavities;

said first support channel having a pair of spaced apart first support channel side walls and a first support channel base wall, each said first support channel side wall having an upper portion and a lower portion being orientated with each other at an angle of about 90 degrees, said upper portion of each said support channel side wall being aligned substantially parallel to one another, said lower portion of each said first support channel side wall being aligned substantially parallel to one another, said first support channel being for supporting a project board inserted therein;

said first support channel, said first instrument depression, said first instrument cavities being located towards said first end region, each said first instrument cavity being positioned adjacent a said lateral side, said first support channel being extended between said lateral sides, said first instrument depression being extended between said lateral sides, said first instrument depression being positioned between said first instrument cavities and said first support channel;

said second support channel having a pair of spaced apart second support channel side walls and a second support channel base wall, each said second support channel side wall having an upper portion and a lower portion being orientated with each other at an angle of about 90 degrees, said upper portion of each said second support channel side wall being aligned substantially parallel to one another, said lower portion of each said second support channel side wall being aligned substantially parallel to one another, said second support channel being for supporting a project board inserted therein;

said upper portion of each side wall being positioned adjacent the associated lower portion of the respective side wall;

said upper portions of said side walls intersecting said upper surface of said base member;

said lower portions of said side walls being positioned adjacent the associated base wall of the respective support channel; and said second support channel, said second instrument depression, said second instrument cavities being located towards said second end region, each said second instrument cavity being positioned adjacent a said lateral side, said second support channel being extended between said lateral sides, said second instrument depression being extended between said lateral sides, said second instrument depression being positioned between said second instrument cavities and said second support channel.

* * * * *